United States Patent
Kaizuka

[11] Patent Number: 5,950,435
[45] Date of Patent: Sep. 14, 1999

[54] ICE FOR PRESERVING THE FRESHNESS OF FOODSTUFF

[75] Inventor: Takayoshi Kaizuka, Tone-machi, Japan

[73] Assignee: Daisho Sangyo Kabushiki-Kaisha, Tokyo, Japan

[21] Appl. No.: 09/054,396

[22] Filed: Apr. 3, 1998

[30] Foreign Application Priority Data

Jul. 10, 1997 [JP] Japan .................................. 9-200744

[51] Int. Cl.$^6$ .......................... B65B 63/08; F25D 17/02; F24F 3/16; B65D 85/00
[52] U.S. Cl. .................. 62/1; 62/60; 62/64; 62/78; 426/124
[58] Field of Search .............................. 62/1, 59, 60, 62, 62/66, 78, 64; 426/398, 124; 252/380

[56] References Cited

U.S. PATENT DOCUMENTS

| | | | |
|---|---|---|---|
| 1,016,627 | 2/1912 | Higgins | 426/109 |
| 2,574,763 | 11/1951 | Sears | 62/1 |
| 2,800,456 | 7/1957 | Shepherd | 62/1 |
| 5,124,164 | 6/1992 | Matsumoto et al. | 426/398 |

*Primary Examiner*—William Doerrler
*Attorney, Agent, or Firm*—Lowe Hauptman Gopstein Gilman & Berner

[57] ABSTRACT

An ice keeps the temperature of foodstuff at the freezing point, inhibits the propagation of bacteria or germ, and suppresses the number of bacteria or germs as low as possible. The ice of the present invention comprises a frozen mixture of water and finely divided particles of metal element or metal oxide having sterilizing power.

15 Claims, 4 Drawing Sheets germicidal power of ice including silver – zeolite against Salmonella gallinarum (cell/cm²)

| | | mackrel | saurel | porgy |
|---|---|---|---|---|
| immediately after beginning of the experiment | present embodiment | $6.8 \times 10^4$ | $1.5 \times 10^4$ | $3.8 \times 10^4$ |
| | prior art | $5.4 \times 10^4$ | $8.0 \times 10^4$ | $2.1 \times 10^4$ |
| after 24 hours had passed | present embodiment | $9.0 \times 10$ | $5.1 \times 10^2$ | $< 10$ |
| | prior art | $9.5 \times 10^4$ | $2.7 \times 10^4$ | $1.7 \times 10^5$ |
| after 48 hours had passed | present embodiment | $< 10$ | $1.5 \times 10^2$ | $< 10$ |
| | prior art | $2.5 \times 10^4$ | $3.9 \times 10^5$ | $6.8 \times 10^4$ |

FIG. 1 germicidal power of the ice including silver − zeolite against Vibrio parahaemolyticus (cell/cm²)

|  |  | mackrel | saurel | porgy |
|---|---|---|---|---|
| immediately after beginning of the experiment | present embodiment | $2.4 \times 10^6$ | $4.0 \times 10^5$ | $2.8 \times 10^6$ |
|  | prior art | $3.2 \times 10^6$ | $2.6 \times 10^6$ | $2.4 \times 10^6$ |
| after 24 hours had passed | present embodiment | $2.0 \times 10$ | $3.1 \times 10^2$ | $1.5 \times 10$ |
|  | prior art | $4.5 \times 10^4$ | $6.0 \times 10^3$ | $8.5 \times 10^4$ |
| after 48 hours had passed | present embodiment | $< 10$ | 80 | 50 |
|  | prior art | $3.8 \times 10^5$ | $5.5 \times 10^5$ | $7.8 \times 10^4$ |

FIG. 2 germicidal power of ice including silver − zeolite against Salmonella gallinarum (cell/cm²)

|  |  | mackrel | saurel | porgy |
|---|---|---|---|---|
| immediately after beginning of the experiment | present embodiment | $6.8 \times 10^4$ | $1.5 \times 10^4$ | $3.8 \times 10^4$ |
|  | prior art | $5.4 \times 10^4$ | $8.0 \times 10^4$ | $2.1 \times 10^4$ |
| after 24 hours had passed | present embodiment | $9.0 \times 10$ | $5.1 \times 10^2$ | $< 10$ |
|  | prior art | $9.5 \times 10^4$ | $2.7 \times 10^4$ | $1.7 \times 10^5$ |
| after 48 hours had passed | present embodiment | $< 10$ | $1.5 \times 10^2$ | $< 10$ |
|  | prior art | $2.5 \times 10^4$ | $3.9 \times 10^5$ | $6.8 \times 10^4$ |

FIG. 3

Minimal Inhibitory Concentration (MIC: ppm)

|  | subject of this test | deposition No. | MIC |
|---|---|---|---|
| bacterias | Vibrio parahaemolyticus | IFO 12711 | 64 |
| | Salmonella gallinarum | IFO 3163 | 125 |
| | Enterobacter aerogenes | IFO 13534 | 125 |
| | Escherichia coli | IFO 3301 | 64 |
| | Pseudomonas aeruginosa | IIDP-1 | 64 |
| | Staphylococcus aureus | ATCC 6538P | 125 |
| mold | Aspergillus niger | IFO 4407 | 500 |
| | Aureobasidium pullulans | IFO 6353 | 500 |
| | Chaetomium globosum | ATCC 6205 | 500 |
| | Gliocladium virens | IFO 6355 | 500 |

FIG. 4

Test for the acquirability of the resistivity against silver-zeolite (MIC: ppm)

| time | Staphylococcus aureus | MRSA | Pseudomonas aeruginosa |
|---|---|---|---|
| 1 | 125 | 250 | 125 |
| 2 | 250 | 250 | 125 |
| 3 | 125 | 125 | 64 |
| 4 | 125 | 125 | 125 |
| 5 | 125 | 125 | 64 |
| 6 | 125 | 125 | 64 |
| 7 | 125 | 125 | 64 |
| 8 | 125 | 125 | 125 |
| 9 | 125 | 125 | 64 |
| 10 | 125 | 125 | 125 | deodorant effect against hydrogen sulfide deodorant effect against ammonium deodorant effect against methyl mercaptan deodorant effect against trimethylamine

ICE FOR PRESERVING THE FRESHNESS OF FOODSTUFF

BACKGROUND OF THE INVENTION

1. Technical Field

The present invention relates to an ice for preserving the freshness of foodstuff such as raw fish or vegetables.

2. Description of the Prior Art

In the course of transportation or preservation of raw fishes or vegetables, these foodstuff are adapted to be maintained at the freezing point (approximately 0° C.) by crushed ice packed therearound.

In the prior art, the ice utilized in the preservation of foodstuff is often made of tap water, and it functions to keep the foodstuff at the freezing point to inhibit the propagation of germ or bacteria to avoid the deterioration thereof.

Bacteria or germ attached to foodstuff often cause the outbreak of bromatoxism. Included in such bacteria are colibacillus, staphylococcus aureus, pseudomonas aeruginosa, salmonella gallinarum, and vibrio parahaemolyticus, and fungus such as black mold.

At the freezing point, although the propagation of bacteria or germs recited above is inhibited or the number of germs is reduced, bacteria or germs still survive in such condition. In this connection, after the ice is melted away and the temperature of water surrounding the foodstuff is increased, bacteria or germs will begin their propagation rapidly.

In the case of vibrio parahaemolyticus, for example, they complete their cytodieresis within 10 minutes or so, and propagates in a fashion of logarithmic function, so that they reach the sufficient number to outbreak the bromatoxism within short period of time.

In addition, while vibrio parahaemolyticus, which is one of haliphile, is attached to fishery products derived from the sea, the water obtained by the melting of the ice surrounding the products will be a brine i.e. the good media for the propagation of germs.

Accordingly the object of the present invention is to provide an ice for preserving the freshness of foodstuff for a longer period than that obtained by prior art. The ice of the present invention can keep the temperature of the foodstuff at the freezing point, inhibit the propagation of bacteria or germs, and suppress the number of bacteria or germs as law as possible.

SUMMARY OF THE INVENTION

These and other objects are achieved by an ice of the present invention wherein an ice for preserving the freshness of foodstuff comprises a mixture of water and finely divided particles of metal element or metal oxide having sterilizing power.

Said ice comprising a mixture of water and metal element or metal oxide carried by carrier. Said metal element is silver, copper, and/or zinc, and said metal oxide is zinc oxide and/or titanium oxide, and wherein said metal element and/or said metal oxide is used solely or in combination. Said carrier is a finely divided particle of clay, silica gel, silica, alumina, zirconium phosphate, calcium phosphate, glass, complex salt, and/or activated carbon, and wherein these materials are employed solely or in combination.

BRIEF DESCRIPTION OF THE DRAWINGS

FIG. 1 is a table showing the results of an experiment for confirming the effectiveness against Vibrio parahaemolyticus attached to raw fish, by using the ice of the present invention;

FIG. 2 is a table showing the results of an experiment for confirming the effectiveness against Salmonella gallinarum attached to raw fish, by using the ice of the present invention;

FIG. 3 is a table representing the measured results of Minimal Inhibitory Concentration of silver-zeolite against bacteria and molds, by using the ice of the present invention;

FIG. 4 is a table representing the results of a test for determining whether germ will acquire the resistivity against silver-zeolite, by using the ice of the present invention;

DETAILED DESCRIPTION OF THE PRESENT INVENTION

Figure 5:
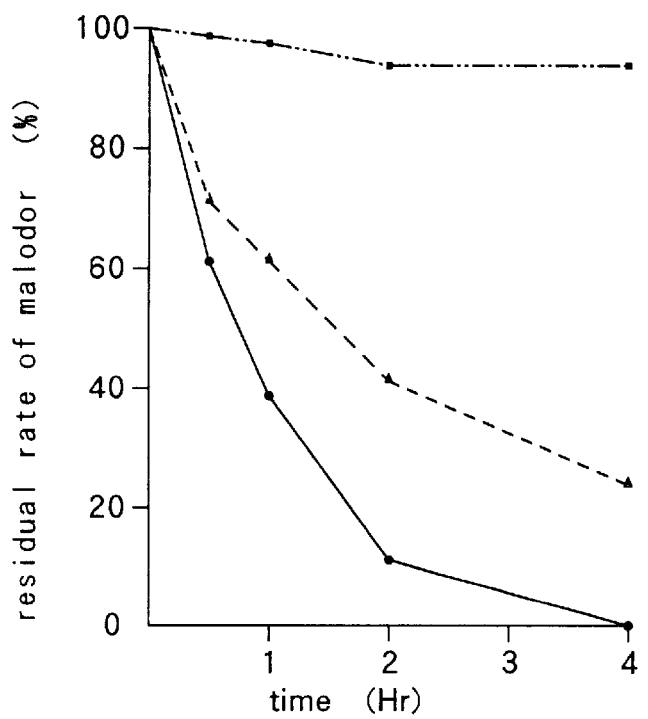
FIG. 5 is a graph representing the results of a test for the deodorant effect of silver-zeolite against hydrogen sulfide, by using the ice of the present invention.

A preferred embodiment of an ice for keeping the freshness of foodstuff in accordance with the present invention will now be described in detail.

The ice of this embodiment is made of a mixture of water and silver-zeolite in which silver element is carried by zeolite, i.e. zeolite is a carrier of silver element. The concrete example of silver-zeolite will be described.

Silver-zeolite is a composition in which silver and zinc are carried by zeolite.

The constitutional formula of silver-zeolite is defined as follows.

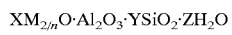

$$XM_{2/n}O \cdot Al_2O_3 \cdot YSiO_2 \cdot ZH_2O$$

wherein, M represents an element such as silver, zinc, and sodium;

n is the valence number of the element; and

X, Y, and Z represent molar ratio among each components.

The germicidal power of silver-zeolite is considered to be obtained by bonding silver ion or zinc ion to the S-H radical of the protein of enzyme of bacteria, and inhibit the activity of the enzyme to kill bacteria.

An experiment is effected with using the ice made in accordance with the above mentioned embodiment.

In this experiment, germ solutions are prepared by using Vibrio parahaemolyticus (ATCC 11778) and Salmonella gallinarum (IFO 3163). The experiment is started after submerging the raw fish in the germ solutions to stick bacteria or germ thereto, and packing it with the ice within an insulating container to keep the interior of the container at the freezing point (approximately 0° C.). In this experimentation, the number of germs attached to the raw fish after having passed for 24 hours, and that after 48 hours are counted.

In this experimentation, the ice employed includes silver-zeolite of 0.1 W/W %, the concentration of the germ solution of Vibrio parahaemolyticus is $8.2 \times 10^6$ cell/ml, that of Salmonella gallinarum is $2.8 \times 10^5$ cell/ml, and the raw fish is mackerel, saurel, or porsy caught before 24 hours or less.

The raw fish is used without taking out the bowels thereof. The amount of the ice employed is substantially the same as that of the raw fish. The diameter of the ice is from about 4 cm to 5 cm.

The experimental results obtained by using the ice of above mentioned embodiment against the raw fish submerged in the germ solution of Vibrio parahaemolyticus is as represented in FIG. 1. As can be seen from this, the number of germs is reduced remarkably after 24 hours from the beginning of the experimentation, and the number of germs is further reduced to substantially aseptic after 48 hours had passed.

The experimental results obtained by using the ice of above mentioned embodiment against the raw fish submerged in the germ solution of Salmonella gallinarum is as represented in FIG. 2. As can be seen from this, substantially the same results can also be obtained in the case of Salmonella gallinarum.

In the tables as shown in FIGS. 1 and 2, the experimental results obtained by using prior art ice consisting only of the tap water are also shown for the sake of comparison.

In the case that the ice of prior art is used, the number of germ are not decreased, yet, in some cases, the growth of germs is recognized. Whereas, the ice of the embodiment of the present invention in which silver-zeolite is included, the number of germs is decreased to substantially aseptic after 48 hours had passed, i.e. it can be seen that the remarkable sterilizing effect can be obtained thereby.

Next, Minimal Inhibitory Concentration (MIC) is measured against a plurality of bacteria and funguses(molds), and the result obtained thereby is represented in FIG. 3.

In the measurement of the Minimal Inhibitory Concentration, the sequentially diluted suspensions of silver-zeolite (1000, 500, 250, 125, 64, 32, 16, 8, 4, 2, 1 ppm) are added to the culture media for measuring susceptibility and solidified to make flat plates for measuring susceptibility. The subjects (bacteria and/or molds) of this test are cultured respectively, and solutions of $10^6$ cell/ml for testing are prepared for each subject. Each subject is applied to the flat plates respectively, and bacteria are cultured for 18 to 20 hours at 37° C., and molds are cultured for 7 days at 25° C.

It can be appreciated from the results obtained by this testing that the growth of bacteria can be inhibited by the solution of more than 125 ppm, and the growth of molds can be inhibited by the solution of more than 500 ppm.

Thus, substantially the same results are obtained with respect to bacteria and molds. This means that silver-zeolite is less dependent on the difference of the kind of bacteria and/or molds, i.e. silver-zeolite has substantially the same sterilizing power against any germ.

Recently, the intramural infection by Methicillin Resistant Staphylococcus Aureus (MRSA) which acquires the resistivity against antibiotics such as methicillin has been the problem. In this connection, the test for the acquirability of the resistivity against silver-zeolite is made with respect to Staphylococcus aureus (IFO 12732), MRSA, and Pseudomonas aeruginosa (IID P-1). The results obtained are as shown in FIG. 4.

From the results of this test, it can be appreciated that germ tested can not acquire the resistivity against silver-zeolite, so that silver-zeolite may be used repeatedly or continuously without providing the resistivity with germ.

Further, silver-zeolite provides the effect to deodorize the malodor as well as the germicidal power as described hereinabove. The deodorant effect is obtained not only by the above-mentioned germicidal power avoiding the malodor inherent on germ themselves, but also by absorbing the malodor itself.

Figure 6:
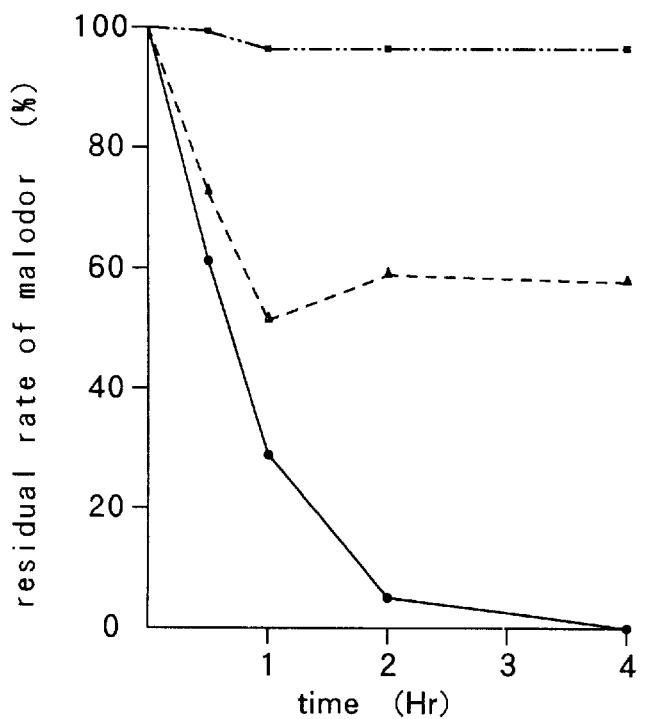
FIG. 6 is a graph representing the results of a test for the deodorant effect of silver-zeolite against ammonium sulfide, by using the ice of the present invention.
Figure 7:
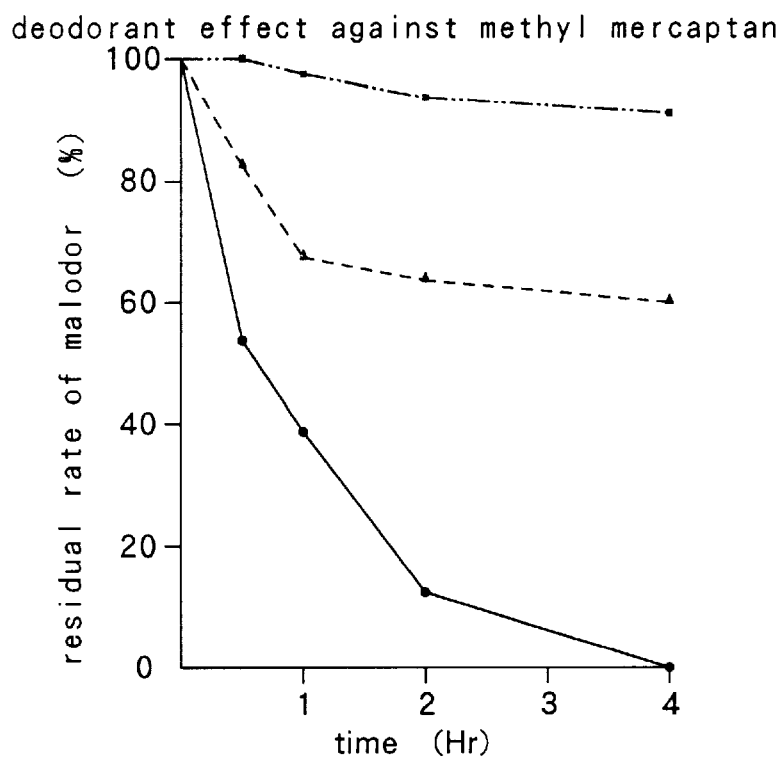
FIG. 7 is a graph representing the results of a test for the deodorant effect of silver-zeolite against methyl mercaptan sulfide, by using the ice of the present invention.
Figure 8:
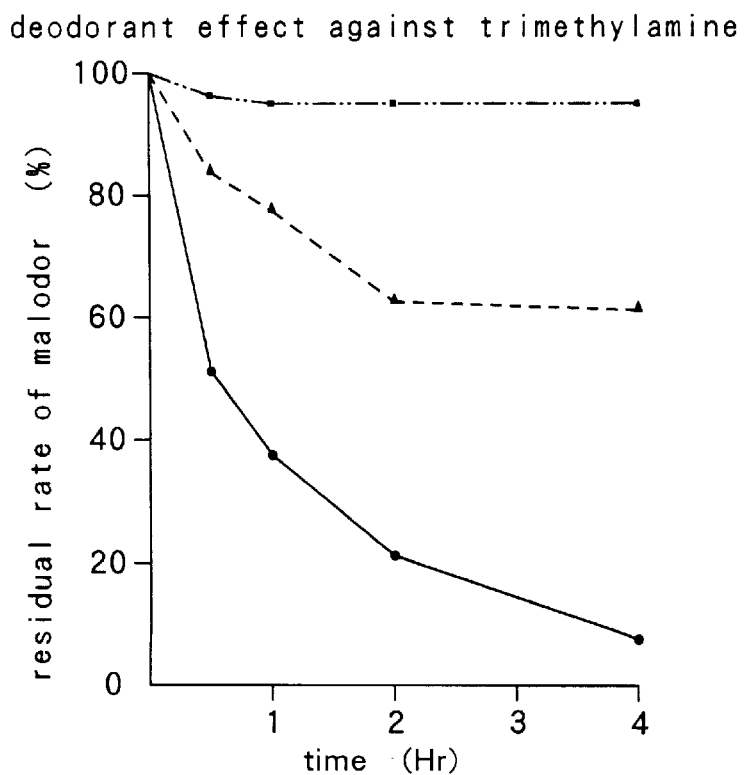
FIG. 8 is a graph representing the results of a test for the deodorant effect of silver-zeolite against trimethylamine sulfide by using the ice of the present invention.

The effect of silver-zeolite against malodorous gas such as hydrogen sulfide, ammonia, methyl mercaptan, and trimethylamine is measured with the time elapsed. Silver-zeolite and malodorous gas is deposited in a wide-mouthed bottle, and the change of the concentration of the gas is measured by means of a gas detector. The results of the measurements of the tests are illustrated in FIGS. 5–8, wherein the residual rate (%) of each malodorous gas is represented by the axis of ordinates, and the time elapsed is represented by the axis of abscissa. The result obtained in the case silver-zeolite is not used is illustrated by dotted line, and the result obtained by utilizing activated carbon in lieu of silver-zeolite is illustrated by two-dot chain line for the sake of comparison. In the latter case, the amount of activated carbon is same as that of silver-zeolite.

The volume of the wide-mouthed bottle is 5 liter, the initial concentration of each malodorous gas is 50 ppm, the amount of silver-zeolite is 0.5 g, and measured atmospheric temperature is from 18° C. to 23° C.

In conclusion, it can be appreciated that any malodorous gas is substantially removed after 4 hours had passed.

The ice of the present invention is adapted to contact directly with foodstuff such as raw fish, so that some testings are effected with respect to the ingestive chronic or acute toxicity, mutagenicity, primary skin irritation, and carcinogenicity. In any of the results obtained by such testings, it is ascertained that the ice the present invention is sufficiently safe to be used with foodstuff.

The elution of silver and zinc from silver-zeolite is also tested. In accordance with the results of obtained by this test, the amount of elution is substantially minimum. In this connection, the security of silver-zeolite is further ascertained. It is further found that the sterilizing power of silver-zeolite can be maintained for a long period, since silver and zinc are not eluted substantially from silver-zeolite.

The ice consist of water and silver-zeolite is adapted to be used by packing it with foodstuff within a container for transportation or preservation of foodstuff.

The foodstuff is cooled to the freezing point (approximately 0° C.) by the ice to preserve the freshness thereof.

The ice is adapted to be melted away in the course of time, so that the water from the ice disposed above the foodstuff flows along the surface of the foodstuff to the downward direction.

Silver-zeolite included in the ice is also present in the water obtained by melting of the ice, so that silver-zeolite included in the water also sterilizes germs presented on the surface of the foodstuff, preventing the foodstuff from deterioration, and avoids the change of color of the foodstuff due to the effect of germs.

The ice of prior art has a disadvantage caused by the water fused therefrom. In other words, the water trapped within the container has become a good medium for growing germ. Whereas, in the case of the ice of the present invention, germs presented in the fused water are all eliminated by the action of silver-zeorite td inhibit the propagation of germs.

In the embodiment described hereinabove, although zeolite carries silver as well as zinc, it may carry only silver, only one of zinc or copper, or both of zinc and copper. However, germicidal power to be obtained will be decreased a little. Further, in the embodiment described hereinabove, carrier is zeolite which is one of silicate. However, there are other carriers which can be employed in lieu of zeolite, for example clay which is another silicate, silica gel, silica, alumina, zirconium phosphate or calcium phosphate (apatite), glass, complex salt, or activated carbon.

In another embodiment, no carrier can be used, and finely divided particles of metal element or metal oxide with sterilizing power such as silver, copper, of zinc oxide, and titanium oxide is used solely or in combination.

The Minimal Inhibitory Concentration (MIC) against Staphylococcus aureus (IFO 12732) of each of titanium oxide and zinc oxide having a diameter ranged from $0.1 \times 10^{-6}$ m to $5.0 \times 10^{-6}$ m are 64 ppm and 250 ppm respectively.

The ice set forth in the above embodiment or water fused therefrom can be disposed of as it is without causing any effect against environment, since metal element or metal oxide and carrier are inorganic matter of natural origin.

The Effect and Advantages of this Invention

The freshness of the foodstuff can be preserved by packing it with the ice of the present invention to cool it to the freezing point (approximately 0° C.) and keep this temperature.

The particles of metal element or metal oxide included in the ice or metal element or metal oxide carried by the carrier included in the ice are flowing little by little with water fused from the ice along the surface of the foodstuff, and contact with germ attached to the surface of the foodstuff to germicide and sterilize the foodstuff. Thus obtained germicidal power can be maintained unless all ices are melted.

The particles of metal element or metal oxide or metal element or metal oxide carried by the carrier are also included in the fused water, so that germ washed away from the surface of the foodstuff are also attacked in the fused water. In this connection, sterilizing power can also be obtained even after the ice is completely melted.

In conclusion, in case germs or bacteria causing sitotoxism are attached to the surface of the foodstuff, these germ or bacteria are eliminated by the ice of the present invention, so that transportation or preservation of foodstuff can be made with keeping the quality and safety of the foodstuff for long times.

Further, in the case that zeolite is employed as carrier, malodor gas can be absorbed, so that transportation or preservation of foodstuff can be made in a condition valuable as an article of commerce and has substantially no malodor.

What is claimed is:

1. Ice for preserving freshness of foodstuff comprising a frozen mixture of water and finely divided particles of at least one of a group consisting of a metal element and a metal oxide having sterilizing power.

2. Ice for preserving freshness of foodstuff comprising a frozen mixture of water and a component including at least one of a group consisting of a metal element and a metal oxide having sterilizing power, said ice further comprising a carrier carrying said component.

3. Ice for preserving freshness of foodstuff in accordance with claim 1, wherein said metal element is selected from a group consisting of silver, copper, and zinc, and said metal oxide is selected from a group consisting of zinc oxide and titanium oxide.

4. Ice for preserving freshness of foodstuff in accordance with claim 2, wherein said metal element is selected from a group consisting of silver, copper, and zinc, and said metal oxide is selected from a group consisting of zinc oxide and titanium oxide.

5. Ice for preserving freshness of foodstuff in accordance with claim 2, wherein said carrier comprises finely divided particles of at least one member of a group consisting of clay, silica gel, silica, alumina, zirconium phosphate, calcium phosphate, glass, complex salt, and activated carbon.

6. Ice for preserving freshness of foodstuff in accordance with claim 4, wherein said carrier comprises finely divided particles of at least one member of a group consisting of clay, silica gel, silica, alumina, zirconium phosphate, calcium phosphate, glass, complex salt, and activated carbon.

7. Ice for preserving freshness of foodstuff in accordance with claim 3, wherein said particles comprise both said metal element and said metal oxide.

8. Ice for preserving freshness of foodstuff in accordance with claim 4, wherein said component comprises both said metal element and said metal oxide.

9. Ice for preserving freshness of foodstuff in accordance with claim 4, comprising a frozen mixture of water and silver-zeolite, wherein said component comprises silver and said carrier comprises zeolite.

10. Ice for preserving freshness of foodstuff in accordance with claim 4, comprising a frozen mixture of water and silver-zeolite, wherein said component comprises silver and zinc and said carrier comprises zeolite.

11. Ice for preserving freshness of foodstuff in accordance with claim 4, wherein said component comprises zinc and said carrier comprises zeolite.

12. Ice for preserving freshness of foodstuff in accordance with claim 4, wherein said component comprises copper and said carrier comprises zeolite.

13. Ice for preserving freshness of foodstuff in accordance with claim 4, wherein said component comprises zinc and copper and said carrier comprises zeolite.

14. Ice for preserving freshness of foodstuff wherein the ice is produced by freezing a mixture of water and finely divided particles of at least one of a group consisting of a metal element and a metal oxide having sterilizing power.

15. Ice for preserving freshness of foodstuff wherein the ice is produced by freezing a mixture of water and a component including at least one of a group consisting of a metal element and a metal oxide having sterilizing power, the component being carried by a carrier.

* * * * *